United States Patent [19]

Saibara et al.

[11] Patent Number: 6,099,627
[45] Date of Patent: Aug. 8, 2000

[54] DISPERSION INK

[75] Inventors: Shoji Saibara, Toride; Shigeo Aoyama; Tetsuya Taki, both of Ibaraki-ken, all of Japan

[73] Assignee: Hitachi Maxell, Ltd., Osaka, Japan

[21] Appl. No.: 09/123,577

[22] Filed: Jul. 28, 1998

[30] Foreign Application Priority Data

Jul. 28, 1997 [JP] Japan ...................... 9-201219

[51] Int. Cl.$^7$ .................................. C09D 11/02
[52] U.S. Cl. ...................... 106/31.33; 106/31.58; 106/31.59; 106/31.65; 106/31.86; 106/31.89; 106/499
[58] Field of Search .............. 106/31.33, 31.58, 106/31.59, 31.65, 31.86, 31.89, 499

[56] References Cited

U.S. PATENT DOCUMENTS

| | | | |
|---|---|---|---|
| 5,605,566 | 2/1997 | Yui et al. | 106/31.58 |
| 5,621,021 | 4/1997 | Yoshioka et al. | 106/31.67 |
| 5,658,376 | 8/1997 | Noguchi et al. | 106/31.59 |
| 5,954,866 | 9/1999 | Ohta et al. | 106/31.89 |

FOREIGN PATENT DOCUMENTS 594665  1/1984  Japan .
8143804  6/1996  Japan .

*Primary Examiner*—Helene Klemanski
*Attorney, Agent, or Firm*—Birch, Stewart, Kolasch & Birch, LLP

[57] ABSTRACT

The present invention provides a dispersion ink excellent not only high-definition print quality but also re-dispersibility. More particularly, the present invention provides a dispersion ink comprising at least a pigment or a disperse dye, which has a particle diameter of 75 nm or less, an amphiphilic compound, and water, said amphiphilic compound having a hydrophilic portion composed of a poly (ethylene oxide) and a hydrophobic portion composed of an alkyl group and/or an aromatic group and bonded to the hydrophilic portion, said amphiphilic compound containing at least one ionic group at the end of the poly(ethylene oxide) constituting the hydrophilic portion which is not bonded to the hydrophobic portion, and the whole amphiphilic compound having a molecular weight of 5,000 or less, wherein between the particle diameter of said pigment or said disperse dye and the molecular weight of said amphiphilic compound, there is the relationship represented by the following expression (1):

$0.004 \leq$ (the particle diameter (nm) of the pigment or the disperse dye)/(the molecular weight of the amphiphilic compound)$\leq 0.04$.                     (1)

14 Claims, No Drawings

DISPERSION INK

BACKGROUND OF THE INVENTION

The present invention relates to a dispersion ink, in particular, an ink suitable for an ink-jet printing method comprising the ejection of ink droplets from a print head. More particularly, it relates to a dispersion ink excellent in not only high-definition print quality but also re-dispersibility.

Since dye-dissolved inks conventionally used for ink-jet recording have defects such as low light-fastness and waterfastness, pigmented inks excellent in lightfastness and waterfastness have come to be used in some cases. The pigmented inks have to contain dispersedwater-insoluble pigment particles and have to be stably storable. For example, Japanese Patent Laid-Open Nos. 62-116678, 1-301760, 2-255875, 4-334870 and 8-209048 disclose water-based pigmented inks.

Japanese Patent Laid-Open No. 59-4665 discloses an ink excellent in long-term storage stability, continuous jet stability, etc. In addition, Japanese Patent Laid-Open No. 8-143804 discloses an aqueous dispersion for bubble jet which permits stable jet in bubble jet recording and is excellent in fixability.

In recent years, with an improvement in ink jet printers, such as an increase of definition, the range of use of ink jet is increased and ink has come to be used in various circumstances. Therefore, it has become necessary to consider conditions of use in severe circumstances, such as temperature cycles, vibration-fastness, etc. Particularly for high-density printing, the particle diameter of a pigment or a disperse dye has to be adjusted to a small value. However, the above references, disclose neither a method for using pigment fine particle with an average particle size of 75 nm or less in ink, nor investigation on the re-dispersibility of a pigment or a disperse dye.

SUMMARY OF THE INVENTION

An object of the present invention is to provide a dispersion ink used for ink-jet recording, in particular, a dispersion ink which is excellent in not only high-definition print quality but also re-dispersibility and can be obtained by using ultrafine particles of a pigment or a disperse dye which have an average particle diameter of 75 nm or less.

As a result of our earnest investigation, the following was found: in particular, the smaller the particle diameter of a pigment or a disperse dye, the larger the specific surface area of particles thereof and the much larger the number of particles thereof per a unit volume, and in these circumstances, the relationship between the particle diameter of the pigment or the disperse dye and the molecular weight of a dispersant is important. Thus, the present invention has been accomplished. The dispersion ink of the present invention is an ink comprising at least a pigment or a disperse dye, which has a particle diameter of 75 nm or less, an amphiphilic compound, and water. Said amphiphilic compound has a hydrophilic portion composed of a poly(ethylene oxide) and a hydrophobic portion composed of an alkyl group and/or an aromatic group and bonded to the hydrophilic portion. Said amphiphilic compound contains at least one ionic group at the end of the poly(ethylene oxide) constituting the hydrophilic portion which is not bonded to the hydrophobic portion. The whole amphiphilic compound has a molecular weight of 5,000 or less. Between the particle diameter of said pigment or said disperse dye and the molecular weight of said amphiphilic compound, there is the relationship represented by the following expression (1):

$$0.004 \leq \text{(the particle diameter (nm) of the pigment or the disperse dye)}/\text{(the molecular weight of the amphiphilic compound)} \leq 0.04 \quad (1)$$

DETAILED DESCRIPTION OF THE INVENTION

According to our earnest investigation, the following is conjectured: since hydrophobic groups such as aromatic groups are present on the surface of a pigment or a disperse dye, the hydrophobic portion of an amphiphilic compound is adsorbed on each hydrophobic group, and the hydrophilic portion of the amphiphilic compound extends into an aqueous solution to disperse particles of the pigment or the disperse dye. In particular, fine particles of a pigment or a disperse dye, which has an average particle diameter of 75 nm or less have a large specific surface area and can be present in a greatly increased number per a unit volume, so that dispersed particles of the pigment or the disperse dye are easily coagulated. Therefore, when such fine particles of the pigment or the disperse dye are used, the molecular weight of the amphiphilic compound has to be increased to some degree for assuring the re-dispersibility. On the other hand, the increase of molecular weight of the amphiphilic compound inhibits atomization of the pigment. For attaining both the re-dispersibility and the atomization, it is necessary that the above expression (1) should exist between the particle diameter of the pigment or the disperse dye and the molecular weight of an amphiphilic compound. When there is employed a combination of a pigment or a disperse dye and an amphiphilic compound which satisfies the expression (1), the molecular weight of the amphiphilic compound in ink is high relative to the number of particles of the pigment or the disperse dye, and a large number of the hydrophobic portions of molecules of the amphiphilic compound are adsorbed on the hydrophobic groups (e.g. aromatic groups) on the surface of the pigment or the disperse dye, whereby the pigment or the disperse dye is improved in dispersibility and can be made into ink having a high dispersion stability of particles of the pigment or the disperse dye, and moreover precipitated particles of the pigment or the disperse dye can easily be re-dispersed. Thus, it becomes possible to disperse the pigment or the disperse dye uniformly to give a low density, so that an excellent high-definition print quality can be attained, and that the so-called re-dispersibility (ease of re-dispersion of precipitated particles of the pigment or the disperse dye) can be improved. In the expression (1), a more preferable range is $0.01 \leq$ (the particle diameter (nm) of the pigment or the disperse dye)/(the molecular weight of the amphiphilic compound) $\leq 0.02$.

It is necessary to adjust the molecular weight of the amphiphilic compound to 5,000 or less. When the pigment or the disperse dye is fine particles, the bore of a nozzle for ink is small, so that unavoidably, the viscosity of ink has to be reduced. An ink excellent in re-dispersibility can be provided by adjusting the molecular weight of the amphiphilic compound to 5,000 or less to reduce the viscosity of the whole ink.

The necessity for the present invention further increases in severe use circumstances in which it is necessary to use a pigment or a disperse dye, which has a particle diameter of 50 nm or less.

The dispersion ink of the present invention preferably has a pH of 7 to 11. When its pH is lower than 7, the ink does not sufficiently permeate into paper in some cases. When the pH is higher than 11, the pigment or the disperse dye in the dispersion ink is precipitated in some cases.

The pigment used in the present invention is not particularly limited and may be a newly synthesized one.

Black pigments include, for example, Color Black FW1, Color Black FW2, Color Black FW18, Color Black FW200, Color Black S150, Color Black S160, Color Black S170, Printex 35, Printex U, Printex 150T, Printex 75, Printex 85, Special Black 4A and Special Black 4 (mfd. by DEGUSSA); No. 2300, No. 900, No. 33, No. 45, No. 2200B, MA 7 and MA 100 (mfd. by Mitsubishi Chemical Industries, Ltd.); and Monarch 700, Monarch 800, Monarch 900, Monarch 1000 (mfd. by Cabot Corp.).

Cyan pigments include, for example, C.I. Pigment Blue 1, C.I. Pigment Blue 2, C.I. Pigment Blue 3, C.I. Pigment Blue 15:3, C.I. Pigment Blue 16, C.I. Pigment Blue 22, and C.I. Pigment Blue 60.

Magenta pigments include, for example, C.I. Pigment Red 5, C.I. Pigment Red 7, C.I. Pigment Red 12, C.I. Pigment Red 112, Pigment Red 122, C.I. Pigment Red 123, and C.I. Pigment B Red 168.

Yellow pigments include, for example, C.I. Pigment Yellow 12, C.I. Pigment Yellow 13, C.I. Pigment Yellow 14, C.I. Pigment Yellow 16, C.I. Pigment Yellow 73, C.I. Pigment Yellow 74, C.I. Pigment Yellow 83, C.I. Pigment Yellow 108, C.I. Pigment Yellow 110, and C.I. Pigment Yellow 182.

The disperse dye used in the present invention is not particularly limited and may be a newly synthesized one.

Green disperse dyes include, for example, C.I. Disperse Green 6:1 and C.I. Disperse Green 9.

Blue disperse dyes include, for example, C.I. Disperse Blue 56, C.I. Disperse Blue 60, C.I. Disperse Blue 73, C.I. Disperse Blue 87, C.I. Disperse Blue 113, C.I. Disperse Blue 128, C.I. Disperse Blue 143, and C.I. Disperse Blue 165.

Violet disperse dyes include, for example, C.I. Disperse Violet 33.

Red disperse dyes include, for example, C.I. Disperse Red 54, C.I. Disperse Red 72, C.I. Disperse Red 86, C.I. Disperse Red 92, C.I. Disperse Red 111, C.I. Disperse Red 126, C.I. Disperse Red 135, C.I. Disperse Red 145, Disperse Red 164, C.I. Disperse Red 181, C.I. Disperse Red 221, C.I. and Disperse Red 348.

Orange disperse dyes include, for example, C.I. Disperse Orange 13, C.I. Disperse Orange 29, C.I. Disperse Orange 49, C.I. Disperse Orange 66, and Disperse Orange 119.

Yellow disperse dyes include, for example, C.I. Disperse Yellow 5, C.I. Disperse Yellow 42, C.I. Disperse Yellow 54, C.I. Disperse Yellow 79, C.I. Disperse Yellow 83, C.I. Disperse Yellow 99, C.I. Disperse Yellow 119, C.I. Disperse Yellow 126, C.I. Disperse Yellow 160, C.I. Disperse Yellow 198, and C.I. Disperse Yellow 224.

The amount of the pigment or the disperse dye, which is used in the present invention is preferably 0.1 to 20 wt %, more preferably 1.0 to 10 wt %, based on the weight of the whole ink composition. When the amount is in the above range, the resulting dispersion ink can have not only satisfactory color tone and optical density but also satisfactory viscosity and storage stability.

The molecular weight of the amphiphilic compound used in the present invention is preferably 1,000 or more. When it is less than 1,000, the dispersion stability is deteriorated in some cases. A more preferable range of the molecular weight is 1,500 to 3,000. The proportion of the poly(ethylene oxide) in the dispersant used in the present invention is preferably 80 to 97 wt %, more preferably 85 to 95 wt %, based on the total weight of the dispersant. When the proportion is in this range, the tendency of coagulation of particles of the pigment or the disperse dye can be reduced, so that the ink can have a satisfactory storage stability.

It is sufficient that as the ionic group, the amphiphilic compound used in the present invention contains at least one member selected from the group consisting of carboxylic acid groups, carboxylic acid salt groups, sulfate ester groups, sulfate ester salt groups, sulfonic acid group, sulfonic acid salt groups, phosphoric ester groups, phosphoric ester salt groups, amino group and ammonium salt groups, at the end of the poly(ethylene oxide) which is not bonded to the hydrophobic portion. As to each of the carboxylic acid salt groups, sulfate ester salt groups, sulfonic acid salt groups, phosphoric ester salt groups and ammonium salt groups, the salt is not particularly limited in kind and includes, for example, salts with alkali metals, quaternary amines, etc.

As the amphiphilic compound used in the present invention, those having an alkylphenyl group as a hydrophobic portion are effective in improving the dispersibility of particles of the pigment or the disperse dye. In general, pigments or disperse dyes for ink-jet printers represented by organic pigments and carbon black have aromatic groups (e.g. phenyl groups, naphthyl groups, etc.) on the surface. Therefore, the alkylphenyl group is adsorbed on each aromatic group on the surface of the pigment or the disperse dye more strongly, so that more effective dispersion of particles of the pigment or the disperse dye becomes possible.

The amount of the amphiphilic compound added in the present invention is preferably 0.1 to 20 wt %, more preferably 0.1 to 10 wt %, based on the weight of the whole ink composition. When the amount is in the above range, the dispersibility of particles of the pigment or the disperse dye and the storage stability of the ink can be improved.

The weight ratio of the pigment or the disperse dye to the amphiphilic compound in the present invention is preferably 1:2 to 10:1. This is for attaining an excellent print quality.

If necessary, a commercially available nonionic or anionic dispersant may be used in combination with the amphiphilic compound used in the present invention, for dispersing the pigment or the disperse dye.

Crusting of a print head with the dispersion ink of the present invention can be further reduced by incorporating the ink with (4) at least one water-soluble organic solvent selected from the group consisting of ethylene glycol, diethylene glycol and glycerol, and (5) at least one water-soluble compound formed by binding of two or three hydroxyl groups to a hydrocarbon of 4 to 6 carbon atoms, or a poly(ethylene glycol), in addition to (1) a pigment or a disperse dye, which has a particle diameter of 75 nm or less, (2) an amphiphilic compound which is composed of a poly(ethylene oxide) as a hydrophilic portion and an alkyl group and/or an aromatic group as a hydrophobic portion and contains at least one ionic group at the end of the poly(ethylene oxide) which is not bonded to the hydrophobic portion, and (3) water.

The water-soluble organic solvent(s) used in the present invention may be at least one member selected from the group consisting of ethylene glycol, diethylene glycol and glycerol.

As the water-soluble compound(s) used in the present invention, there may be used either a single compound or a mixture of two or more compounds so long as the compound (s) is formed by binding of two or three hydroxyl groups to a hydrocarbon of 4 to 6 carbon atoms. The water-soluble compound includes, for example, 1,2-butanediol, 1,4- butanediol, 1,3-butanediol, 2,4-pentanediol, 1,5-pentanediol, 2-methyl-2,4-pentanediol, 1,2-cyclohexanediol, 1,4-cyclohexanediol, trimethylol-ethane, trimethylolpropane, 1,2,4-butanetriol, 1,2,6-hexanetriol, 1,2,5-pentanetriol, 3-methyl-1,5-pentanediol and 3-hexene-2,5-diol.

The molecular weight of the poly(ethylene glycol) used in the present invention ranges preferably from 200 to 2,000. This is for preventing nozzle crusting and the increase of the ink viscosity.

The total content of the water-soluble organic solvent(s) and the water-soluble compound(s) or the poly(ethylene glycol) in the present invention is preferably 8 to 25 wt %. This is for preventing nozzle crusting and attaining an excellent print quality without increasing drying time.

The weight ratio of the water-soluble organic solvent(s) to the water-soluble compound(s) or the poly(ethylene glycol) in the present invention ranges preferably from 2:1 to 1:5. This is for preventing nozzle crusting and attaining an excellent print quality without increasing drying time.

For producing the dispersion ink of the present invention, at least the following components are mixed to effect dispersion: (i) a pigment or a disperse dye, which has a particle diameter of 75 nm or less, (ii) an amphiphilic compound which is composed of a poly(ethylene oxide) as a hydrophilic portion and an alkyl group and/or an aromatic group as a hydrophobic portion and contains at least one ionic group at the end of the poly(ethylene oxide) which is not bonded to the hydrophobic portion, (iii) water, and optionally (iv) at least one water-soluble organic solvent selected from the group consisting of ethylene glycol, diethylene glycol and glycerol, and (v) at least one water-soluble compound formed by binding of two or three hydroxyl groups to a hydrocarbon of 4 to 6 carbon atoms, or a poly(ethylene glycol). If necessary, various additives are added to the resulting dispersion to obtain the ink. It is also possible to prepare a dispersion containing a high concentration of the pigment or the disperse dye and dilute the dispersion with a solvent and various additives to obtain the ink.

In the present invention, there is used a mixed solvent of water and at least one water-soluble organic solvent selected from the group consisting of ethylene glycol, diethylene glycol and glycerol. Other organic solvents may be mixed with the mixed solvent without any problem. The other organic solvents include, for example, triethylene glycol, tripropylene glycol, dimethyl sulfoxide, diacetone alcohol, glycerol monoallyl ether, propylene glycol, poly(ethylene glycol)s, thiodiglycol, N-methyl-2-pyrrolidone, 2-pyrrolidone, γ-butyrolactone, 1,3-dimethyl-2-imidazolidinone, sulfolane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxyethylurea, urea, acetonylacetone, pentaerythritol, hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monometyl ether, dipropylene glycol monopropyl ether, dipropylene glycol monobutyl ether, tripropylene glycol monomethyl ether, glycerol monoacetate, glycerol diacetate, glycerol triacetate, ethylene glycol monomethyl ether acetate, diethylene glycol monomethyl ether acetate, cyclohexanol, 1-butanol,2,5-hexanediol, ethanol, n-propanol, 2-propanol, 1-methoxy-2-propanol, furfuryl alcohol and tetrahydro-furfuryl alcohol.

Of these, in particular, diethylene glycol monobutyl ether and triethylene glycol monobutyl ether can further improve the print quality when incorporated into the dispersion ink obtained in the present invention.

The surface tension of the dispersion ink obtained in the present invention is preferably 20 to 70 dyne/cm. The viscosity of the ink is preferably 10 cP or less, more preferably 5 cP or less, at 25° C. Since water is usually used as a solvent in the ink, the viscosity of the ink is 1 cP or more. Since the dispersion ink obtained in the present invention has a surface tension and a viscosity in the above ranges, it permits stable printing with an ink-jet printer.

The print quality can be further improved by incorporating polymer fine particles into the dispersion ink obtained in the present invention. The polymer fine particles include, for example, Joncryl® 450, Joncryl® 7001, Joncryl® 711, Joncryl® 775, and Joncryl manufactured by Johnson Polymer.

As a dispersing machine for producing the dispersion ink of the present invention, any conventional dispersing machine may be used. There can be exemplified vessel-driven medium mills such as a roll mill, a ball mill, a centrifugal mill, a planetary ball mill, etc.; high-speed rotary mills such as a sand mill, etc.; and medium agitation mills such as an agitation tank type mill, etc. A specific example of process for producing black pigmented ink is a process of dispersing the pigment with a planetary ball mill or a sand mill by using ceramic beads having a diameter of 0.01 to 1.0 mm. When the planetary ball mill is used, the dispersion is preferably carried out at an acceleration of 5 to 50 G. When the sand mill is used, the dispersion is preferably carried out at a packing of of ceramic beads of 50 to 90% and a rotating speed of the blade of 5 to 20 m/s.

In the present invention, it is possible to use various additives conventionally used in inks for ink-jet printers, such as surfactants, agents for preventing crusting of a print head, a defoaming agents for ink, drying-preventing agents, bactericides, humectants, pH adjustors, agents for imparting water-fastness to printed letters, etc., in combination with the components described above.

The ink of the present invention can be used not only as ink for an ink-jet printer but also as common water-based printing ink or paint. Moreover, the dispersion ink obtained by the production process according to the present invention can be used after being changed into a non-aqueous ink or paint by replacement of the aqueous solvent.

The present invention is explained below in further detail with reference to specific examples. In the examples, the particle diameter of each pigment or disperse dye was measured with a centrifugal sedimentation type particle size distribution meter.

DESCRIPTION OF THE PREFERRED EMBODIMENTS

The present invention is explained with reference to the following examples.

EXAMPLES

Synthesis of Amphiphilic Compound A)

In a flask containing 27 parts by weight of succinic anhydride was placed a solution of 100 parts by weight of a polyethylene oxide nonylphenyl ether (Nonypol® 400, a trade name, mfd. by Sanyo Chemical Industries, Ltd.) in 500 parts by weight of toluene, followed by refluxing under nitrogen for 20 hours. The toluene was removed from the reaction solution by distillation and ether was added to the residue, after which the precipitate formed was filtered off and the residue was dried in vacuo. The above procedure was repeated three times to obtain a desired amphiphilic compound A containing a carboxyl group at one end. This compound had a number average molecular weight of 2,000 (in terms of polystyrene) as measured by GPC. The poly (ethylene oxide) content was 84.6 wt % based on the weight of amphiphilic compound.

Synthesis of Amphiphilic Compound B

A desired amphiphilic compound B containing a carboxyl group at one end was obtained in the same manner as for the amphiphilic compound A except for using 150 parts by weight of a polyethylene oxide nonylphenyl ether (Nonypol 700, a trade name, mfd. by Sanyo Chemical Industries, Ltd.) in place of the polyethylene oxide nonylphenyl ether (Nonypol® 400, a trade name, mfd. by Sanyo Chemical Industries, Ltd.). The obtained compound had a number average molecular weight of 3,000 (in terms of polystyrene) as measured by GPC. The poly(ethylene oxide) content was 90.6 wt % based on the weight of amphiphilic compound.

Synthesis of Amphiphilic Compound C

In a flask containing a solution of 100 parts by weight of a polyethylene oxide nonylphenyl ether (Nonypol® 400, a trade name, mfd. by Sanyo Chemical Industries, Ltd.) in 500 parts by weight of toluene was dropped 6.3 parts by weight of chlorosulfonic acid under nitrogen over a period of 1 hour, and the resulting mixture was stirred at room temperature for 3 hours. After completion of the reaction, the hydrogen chloride gas produced as a by-product was removed and the residue was neutralized with a solution of potassium hydroxide in ethanol. The precipitate formed was filtered off and the residue was dried in vacuo to obtain a desired amphiphilic compound C containing a sulfate ester salt group at one end. This compound had a number average molecular weight of 1,500 (in terms of polystyrene) as measured by GPC. The poly(ethylene oxide) content was 83.8 wt % based on the weight of amphiphilic compound.

Synthesis of Amphiphilic Compound D

Into a reactor was charged 100 parts by weight of a polyethylene oxide nonylphenyl ether (Nonypol® 400, a trade name, mfd. by Sanyo Chemical Industries, Ltd.), and heated to 60° C., and 0.04 part by weight of phosphoruspentaoxide was added dropwise over a period of 1 hour. Then, the reaction was carried out at 70° C. for 8 hours. Subsequently, ion-exchanged water was added to the reaction solution and the resulting solution was neutralized with a 20% aqueous potassium hydroxide solution to obtain a desired amphiphilic compound D containing a phosphoric ester salt group at one end (a 25% aqueous solution). The aforesaid phosphoric ester was a mixture of monoester and diester. The obtained compound had a number average molecular weight of 2,400 (in terms of polystyrene) as measured by GPC. The poly(ethylene oxide) content was 93 wt % based on the weight of amphiphilic compound.

Synthesis of Amphiphilic Compound E

Into a reactor was charged 100 parts by weight of a polyethylene oxide nonylphenyl ether (Nonypol® 400, a trade name, mfd. by Sanyo Chemical Industries, Ltd.), and heated to 60° C., and 0.03 part by weight of phosphoruspentaoxide was added dropwise over a period of 1 hour. Then, the reaction was carried out at 70° C. for 8 hours. Subsequently, ion-exchanged water was added to the reaction solution and the resulting solution was neutralized with a 20% aqueous potassium hydroxide solution to obtain a desired amphiphilic compound E containing a phosphoric ester salt group at one end (a 25% aqueous solution). The aforesaid phosphoric ester was a mixture of monoester and diester. The obtained compound had a number average molecular weight of 5,500 (in terms of polystyrene) as measured by GPC. The poly(ethylene oxide) content was 96.8 wt % based on the weight of amphiphilic compound.

EXAMPLE 1

The following ingredients were mixed by means of a sand mill for 2 hours by using zirconia beads with a diameter of 0.3 mm, to obtain a dispersion:

| | |
|---|---|
| Cyan pigment (C.I. Pigment Blue 15:3) | 14 parts by weight |
| Amphiphilic compound A | 8 parts by weight |
| Ion-exchanged water | 78 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain an ink. The particle diameter of the pigment was 25 nm and the quotient obtained by dividing the particle diameter (nm) of the pigment by the molecular weight of the amphiphilic compound was 0.0125.

EXAMPLE 2

The following ingredients were mixed by means of a sand mill for 1 hour by using zirconia beads with a diameter of 0.3 mm, to obtain a dispersion:

| | |
|---|---|
| Cyan pigment (C.I. Pigment Blue 15:3) | 14 parts by weight |
| Amphiphilic compound B | 8 parts by weight |
| Ion-exchanged water | 78 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain an ink. The particle diameter of the pigment was 52 nm and the quotient obtained by dividing the particle diameter (nm) of the pigment by the molecular weight of the amphiphilic compound was 0.0173.

EXAMPLE 3

The following ingredients were mixed by means of a sand mill for 2 hours by using zirconia beads with a diameter of 0.3 mm, to obtain a dispersion:

| Cyan pigment (C.I. Pigment Blue 15:3) | 14 parts by weight |
|---|---|
| Amphiphilic compound C | 7 parts by weight |
| Ion-exchanged water | 79 parts by weight |

To 35 parts by weight of the dispersion were added dropwise 8 parts by weight of diethylene glycol, 6 parts by weight of 1,5-pentanediol and 52 parts by weight of ion-exchanged water with stirring over a period of 30 minutes. Then, the pH was adjusted to 8.0 with triethanolamine to obtain an ink. The particle diameter of the pigment was 22 nm and the quotient obtained by dividing the particle diameter (nm) of the pigment by the molecular weight of the amphiphilic compound was 0.0147.

EXAMPLE 4

The following ingredients were mixed by means of a sand mill for 2 hours by using zirconia beads with a diameter of 0.3 mm, to obtain a dispersion:

| Cyan pigment (C.I. Pigment Blue 15:3) | 14 parts by weight |
|---|---|
| Amphiphilic compound D | 32 parts by weight |
| Ion-exchanged water | 54 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain an ink. The particle diameter of the pigment was 30 nm and the quotient obtained by dividing the particle diameter (nm) of the pigment by the molecular weight of the amphiphilic compound was 0.0125.

EXAMPLE 5

The following ingredients were mixed by means of a sand mill for 2 hours by using zirconia beads with a diameter of 0.3 mm, to obtain a dispersion:

| Cyan pigment (C.I. Pigment Blue 15:3) | 14 parts by weight |
|---|---|
| Styrene-Acrylic acid copolymer (Joncryl ® 62, a trade name, mfd. by Johnson Polymer; active ingredient 34%) | 6 parts by weight |
| Amphiphilic compound A | 6 parts by weight |
| Ion-exchanged water | 74 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain an ink. The particle diameter of the pigment was 35 nm and the quotient obtained by dividing the particle diameter (nm) of the pigment by the molecular weight of the amphiphilic compound was 0.0175.

EXAMPLE 6

The following ingredients were mixed by means of a sand mill for 1 hour by using zirconia beads with a diameter of 0.3 mm, to obtain a dispersion:

| Black pigment (Printex 75, a trade name, mfd. by DEGUSSA) | 14 parts by weight |
|---|---|
| Amphiphilic compound A | 12 parts by weight |
| Ion-exchanged water | 74 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain ink. The particle diameter of the pigment was 40 nm and the quotient obtained by dividing the particle diameter (nm) of the pigment by the molecular weight of the amphiphilic compound was 0.02.

EXAMPLE 7

The following ingredients were mixed by means of a sand mill for 3 hours by using zirconia beads with a diameter of 0.3 mm, to obtain a dispersion:

| Magenta pigment (C.I. Pigment Red 122) | 14 parts by weight |
|---|---|
| Amphiphilic compound A | 8 parts by weight |
| Ion-exchanged water | 78 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain an ink. The particle diameter of the pigment was 45 nm and the quotient obtained by dividing the particle diameter (nm) of the pigment by the molecular weight of the amphiphilic compound was 0.02.

EXAMPLE 8

The following ingredients were mixed by means of a sand mill for 4 hours by using zirconia beads with a diameter of 0.3 mm, to obtain a dispersion:

| Yellow pigment (C.I. Pigment Yellow 74) | 14 parts by weight |
|---|---|
| Amphiphilic compound A | 10 parts by weight |
| Ion-exchanged water | 76 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain an ink. The particle diameter of the pigment was 70 nm and the quotient obtained by dividing the particle diameter (nm) of the pigment by the molecular weight of the amphiphilic compound was 0.035.

EXAMPLE 9

The following ingredients were mixed by means of a sand mill for 2 hours by using zirconia beads with a diameter of 0.3 mm, to obtain a dispersion:

| | |
|---|---|
| Cyan pigment (C.I. Pigment Blue 15:3) | 14 parts by weight |
| Amphiphilic compound A | 8 parts by weight |
| Ion-exchanged water | 78 parts by weight |

To 35 parts by weight of the dispersion were added dropwise 8 parts by weight of diethylene glycol, 7 parts by weight of 1,5-pentanediol, 5 parts by weight of triethylene glycol monobutyl ether and 47 parts by weight of ion-exchanged water with stirring over a period of 30 minutes. Then, the pH was adjusted to 8.0 with triethanolamine to obtain an ink. The particle diameter of the pigment was 20 nm and the quotient obtained by dividing the particle diameter (nm) of the pigment by the molecular weight of the amphiphilic compound was 0.01.

EXAMPLE 10

The following ingredients were mixed by means of a sand mill for 2 hours by using zirconia beads with a diameter of 0.3 mm, to obtain a dispersion:

| | |
|---|---|
| Cyan pigment (C.I. Pigment Blue 15:3) | 14 parts by weight |
| Amphiphilic compound A | 8 parts by weight |
| Ion-exchanged water | 78 parts by weight |

To 35 parts by weight of the dispersion were added dropwise 8 parts by weight of diethylene glycol, 7 parts by weight of 1,5-pentanediol, 6 parts by weight of polymer fine particles (Joncryl 775, a trade name, mfd. by Johnson Polymer) and 46 parts by weight of ion-exchanged water with stirring over a period of 30 minutes. Then, the pH was adjusted to 8.0 with triethanolamine to obtain an ink. The particle diameter of the pigment was 25 nm and the quotient obtained by dividing the particle diameter (nm) of the pigment by the molecular weight of the amphiphilic compound was 0.0125.

EXAMPLE 11

The following ingredients were mixed by means of a sand mill for 4 hours by using zirconia beads with a diameter of 0.3 mm, to obtain a dispersion:

| | |
|---|---|
| Green disperse dye (C.I. Disperse Green 6:1) | 14 parts by weight |
| Amphiphilic compound A | 9 parts by weight |
| Ion-exchanged water | 77 parts by weight |

To 35 parts by weight of the dispersion were added dropwise 15 parts by weight of diethylene glycol and 52 parts by weight of ion-exchanged water with stirring over a period of 30 minutes. Then, the pH was adjusted to 8.0 with triethanolamine to obtain an ink. The particle diameter of the disperse dye was 43 nm and the quotient obtained by dividing the particle diameter (nm) of the disperse dye by the molecular weight of the amphiphilic compound was 0.02.

EXAMPLE 12

The following ingredients were mixed by means of a sand mill for 4 hours by using zirconia beads with a diameter of 0.3 mm, to obtain a dispersion:

| | |
|---|---|
| Red disperse dye (C.I. Disperse Red 54) | 14 parts by weight |
| Amphiphilic compound A | 9 parts by weight |
| Ion-exchanged water | 77 parts by weight |

To 35 parts by weight of the dispersion were added dropwise 15 parts by weight of diethylene glycol and 52 parts by weight of ion-exchanged water with stirring over a period of 30 minutes. Then, the pH was adjusted to 8.0 with triethanolamine to obtain an ink. The particle diameter of the disperse dye was 60 nm and the quotient obtained by dividing the particle diameter (nm) of the disperse dye by the molecular weight of the amphiphilic compound was 0.03.

Comparative Example 1

The following ingredients were mixed by means of a sand mill for 2 hours by using zirconia beads with a diameter of 0.3 mm, to obtain a dispersion:

| | |
|---|---|
| Cyan pigment (C.I. Pigment Blue 15:3) | 14 parts by weight |
| Polyoxyethylene alkyl ether phosphate (TCP-5, a trade name, mfd. by Nikko Chemicals Co., Ltd.; mol. wt. 570) | 10 parts by weight |
| Ion-exchanged water | 76 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain an ink. The particle diameter of the pigment was 70 nm and the quotient obtained by dividing the particle diameter (nm) of the pigment by the molecular weight of the amphiphilic compound was 0.107.

Comparative Example 2

The following ingredients were mixed by means of a sand mill for 2 hours by using zirconia beads with a diameter of 0.3 mm, to obtain a dispersion:

| | |
|---|---|
| Cyan pigment (C.I. Pigment Blue 15:3) | 14 parts by weight |
| Alkyl ether carboxylate (AKYPORLM100, a trade name, mfd. by Nikko Chemicals Co., Ltd.; active ingredient 25%, mol. wt. 690) | 40 parts by weight |
| Ion-exchanged water | 46 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain an ink. The particle diameter of the pigment was 42 nm and the quotient obtained by dividing the particle diameter (nm) of the pigment by the molecular weight of the amphiphilic compound was 0.06.

Comparative Example 3

The following ingredients were mixed by means of a sand mill for 2 hours by using zirconia beads with a diameter of 0.3 mm, to obtain a dispersion:

| Cyan pigment (C.I. Pigment Blue 15:3) | 14 parts by weight |
| --- | --- |
| Polyoxyethylene alkyl ether sulfate (SNP-4N, a trade name, mfd. by Nikko Chemicals Co., Ltd.; mol. wt. 400) | 10 parts by weight |
| Ion-exchanged water | 78 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain an ink. The particle diameter of the pigment was 59 nm and the quotient obtained by dividing the particle diameter (nm) of the pigment by the molecular weight of the amphiphilic compound was 0.1475.

Comparative Example 4

The following ingredients were mixed by means of a sand mill for 2 hours by using zirconia beads with a diameter of 0.3 mm, to obtain a dispersion:

| Green disperse dye (C.I. Disperse Green 6:1) | 14 parts by weight |
| --- | --- |
| Polyoxyethylene alkyl ether sulfate (SNP-4N, a trade name, mfd. by Nikko Chemicals Co., Ltd.; mol wt. 400) | 10 parts by weight |
| Ion-exchanged water | 78 parts by weight |

To 35 parts by weight of the dispersion were added dropwise 15 parts by weight of diethylene glycol and 52 parts by weight of ion-exchanged water with stirring over a period of 30 minutes. Then, the pH was adjusted to 8.0 with triethanolamine to obtain an ink. The particle diameter of the disperse dye was 65 nm and the quotient obtained by dividing the particle diameter (nm) of the disperse dye by the molecular weight of the amphiphilic compound was 0.1675.

Comparative Example 5

The following ingredients were mixed by means of a sand mill for 2 hours by using zirconia beads with a diameter of 0.3 mm, to obtain a dispersion:

| Green disperse dye (C.I. Disperse Green 6:1) | 14 parts by weight |
| --- | --- |
| Amphiphilic compound E | 40 parts by weight |
| Ion-exchanged water | 44 parts by weight |

To 35 parts by weight of the dispersion were added dropwise 15 parts by weight of diethylene glycol and 52 parts by weight of ion-exchanged water with stirring over a period of 30 minutes. Then, the pH was adjusted to 8.0 with triethanolamine to obtain an ink. The particle diameter of the disperse dye was 70 nm and the quotient obtained by dividing the particle diameter (nm) of the disperse dye by the molecular weight of the amphiphilic compound was 0.0127.

Comparative Example 6

The following ingredients were mixed by means of a sand mill for 1 hour by using zirconia beads with a diameter of 0.3 mm, to obtain a dispersion:

| Black pigment (Printex 75, a trade name, mfd. by DEGUSSA) | 14 parts by weight |
| --- | --- |
| Amphiphilic compound E | 36 parts by weight |
| Ion-exchanged water | 50 parts by weight |

To 35 parts by weight of the dispersion were added dropwise 8 parts by weight of diethylene glycol, 7 parts by weight of 1,5-pentanediol and 52 parts by weight of ion-exchanged water with stirring over a period of 30 minutes. Then, the pH was adjusted to 8.0 with triethanolamine to obtain ink. The particle diameter of the pigment was 18 nm and the quotient obtained by dividing the particle diameter (nm) of the pigment by the molecular weight of the amphiphilic compound was 0.0033.

Table 1 shows the particle diameter of the pigment in each of the inks obtained in Examples, the storage stability of the inks, crusting of an print head with the inks, the print quality given by the inks, and the viscosity of the inks.

TABLE 1

| | Re-dispersibility | Viscosity (cps) | Crusting | Prit quality | Textile printability |
| --- | --- | --- | --- | --- | --- |
| Example 1 | ○ | 3.5 | ○ | 1.4 | — |
| Example 2 | ○ | 3.8 | ○ | 1.4 | — |
| Example 3 | ○ | 2.9 | ○ | 1.5 | — |
| Example 4 | ○ | 3.6 | ○ | 1.4 | — |
| Example 5 | ○ | 3.2 | ○ | 1.4 | — |
| Example 6 | ○ | 3.5 | ○ | 1.4 | — |
| Example 7 | ○ | 2.3 | ○ | 1.4 | — |
| Example 8 | ○ | 2.3 | ○ | 1.4 | — |
| Example 9 | ○ | 4.0 | ○ | 1.6 | — |
| Example 10 | ○ | 4.5 | ○ | 1.6 | — |
| Example 11 | ○ | 3.9 | ○ | — | ○ |
| Example 12 | ○ | 3.5 | ○ | — | ○ |
| Comparative Example 1 | Δ | 5.8 | X | 1.0 | — |
| Comparative Example 2 | X | 9.0 | X | Not printable | — |
| Comparative Example 3 | X | 11.0 | X | Not printable | — |

TABLE 1-continued

| | Re-dispersibility | Viscosity (cps) | Crusting | Prit quality | Textile printability |
|---|---|---|---|---|---|
| Comparative Example 4 | X | 11.0 | X | — | X |
| Comparative Example 5 | X | 6.0 | X | — | X |
| Comparative Example 6 | X | 9.0 | X | Not printable | — |

The re-dispersibility was evaluated by forcedly precipitating the pigment or the disperse dye in the ink by centrifugation with a centrifuge at 10,000 G for 3 hours. The rating (mark) for the re-dispersibility is as follows; ○: easy re-dispersion of the pigment or the disperse dye, and Δ: difficult re-dispersion of the pigment or the disperse dye. The viscosity was measured at 25° C. with a viscometer (Model R100, mfd. By Toki Sangyo Co., Ltd.).

The crusting of an ink head was investigated by printing a definite number of letters, allowing the ink head to stand at 50° C. for 7 days without capping and the like, carrying out a cleaning procedure for obviating nozzle crusting, and judging the number of repetitions of the cleaning procedure required for normal printing. The number of repetitions of the cleaning procedure required for normal printing is marked as follows; ○: 1 to 5 times, Δ: 6 to 10 times, and ×: 11 times or more.

The print quality was evaluated by printing a recording pattern on plain paper with an ink-jet printer by using each of the inks of Examples 1 to 10 and Comparative Examples 1 to 3, and measuring the optical density with a Macbeth portable densitometer (RD-12000, mfd. by Sakata Inx Co., Ltd.). A textile printing test was carried out by charging each of the inks of Examples 11 and 12 and Comparative Example 4 into an ink-jet printer, followed by textile printing on a piece of cloth (A4 size). The piece of cloth was heated at 180° C. for 2 minutes and the printed cloth was visually evaluated. The rating (mark) in the test is as follows; ○: sharply printed without nonuniform coloration, Δ: printed with some nonuniform coloration and a slight blur, and ×:too lightly printed with remarkable nonuniform colorlation and a remarkable blur. As the ink-jet printer, Piezo type ink-jet printer MJ-5000C (mfd. by SEIKO EPSON) was used.

As is clear from Table 1, in each of the dispersion inks of the present invention, the pigment or the disperse ink is dispersed by the amphiphilic compound which is composed of a poly(ethylene oxide) as a hydrophilic portion and an alkyl group and/or an aromatic group as a hydrophobic portion and contains at least one member selected from the group consisting of carboxylic acid groups, carboxylic acid salt groups, sulfate ester groups, sulfate ester salt groups, sulfonic acid group, sulfonic acid salt groups, phosphoric ester groups, and phosphoric ester salt groups, at the end of the poly(ethylene oxide) which is not bonded to the hydrophobic portion. These dispersion inks satisfy the above expression (1) and hence are excellent in print quality and storage stability.

What is claimed is:

1. A dispersion ink comprising at least a pigment or a disperse dye, which has a particle diameter of 75 nm or less, an amphiphilic compound, and water, said amphiphilic compound having a hydrophilic portion composed of a poly(ethylene oxide) and a hydrophobic portion composed of an alkyl group and/or an aromatic group and bonded to the hydrophilic portion, said amphiphilic compound containing at least one ionic group at the end of the poly(ethylene oxide) constituting the hydrophilic portion which is not bonded to the hydrophobic portion, and the whole amphiphilic compound having a molecular weight of 5,000 or less, wherein between the particle diameter of said pigment or said disperse dye and the molecular weight of said amphiphilic compound, there is the relationship represented by the following expression (1):

$$0.004 \leq \text{(the particle diameter (nm) of the pigment or the disperse dye)}/\text{(the molecular weight of the amphiphilic compound)} \leq 0.04. \quad (1)$$

2. The dispersion ink according to claim 1, wherein the pH of said dispersion ink ranges from 7 to 11.

3. The dispersion ink according to claim 1, wherein the molecular weight of said amphiphilic compound is 1,000 to 5,000.

4. The dispersion ink according to claim 1, wherein the ionic group of said amphiphilic compound is selected from the group consisting of carboxylic acid groups, carboxylic acid salt groups, sulfate ester groups, sulfate ester salt groups, sulfonic acid group, sulfonic acid salt groups, phosphoric ester groups, phosphoric ester salt groups, amino group and ammonium salt groups.

5. The dispersion ink according to claim 1, wherein said amphiphilic compound contains 80 to 97 wt % of the poly(ethylene oxide).

6. The dispersion ink according to claim 1, wherein the hydrophobic portion of said amphiphilic compound is an alkylphenyl group.

7. The dispersion ink according to claim 1, which further comprises at least one water-soluble organic solvent selected from the group consisting of ethylene glycol, diethylene glycol and glycerol, and a poly(ethylene glycol) or at least one water-soluble compound formed by binding of two or three hydroxyl groups to a hydrocarbon of 4 to 6 carbon atoms.

8. The dispersion ink according to claim 1, which is used in an ink-jet printing method comprising the ejection of ink droplets from a print head.

9. The dispersion ink according to claim 7, which has a viscosity of 10 cP or less at 25° C.

10. A dispersion ink comprising at least a pigment or a disperse dye, which has a particle diameter of 50 nm or less, an amphiphilic compound, and water, said amphiphilic compound having a hydrophilic portion composed of a poly(ethylene oxide) and a hydrophobic portion composed of an alkyl group and/or an aromatic group and bonded to the hydrophilic portion, said amphiphilic compound containing at least one ionic group at the end of the poly(ethylene oxide) constituting the hydrophilic portion which is not bonded to the hydrophobic portion, and the whole amphiphilic compound having a molecular weight of 5,000 or less, wherein between the particle diameter of said pigment or said disperse dye and the molecular weight of said amphiphilic compound, there is the relationship represented by the following expression (1):

0.004≦(the particle diameter (nm) of the pigment or the disperse dye)/(the molecular weight of the amphiphilic compound)≦0.04.    (1)

11. The dispersion ink according to claim 1, wherein the ratio of the particle diameter of the pigment or dispersed dye to the molecular weight of the amphiphilic compound is in the range of 0.01 to 0.02.

12. The dispersion ink according to claim 3, wherein the molecular weight of the amphiphilic compound is 1,500 to 3,000.

13. The dispersion ink according to claim 5, wherein the amphiphilic compound contains 85 to 95 wt % of poly (ethylene oxide).

14. The dispersion ink according to claim 9, which has a viscosity of 5 cp or less at 25° C.

* * * * *